Feb. 29, 1944.          W. B. LEWIS              2,342,676
FREQUENCY CONVERTER SYSTEM FOR GEOPHYSICAL PROSPECTING
Filed Nov. 26, 1941          2 Sheets-Sheet 1

INVENTOR.
William Bradley Lewis
BY

ATTORNEY

Feb. 29, 1944.    W. B. LEWIS    2,342,676
FREQUENCY CONVERTER SYSTEM FOR GEOPHYSICAL PROSPECTING
Filed Nov. 26, 1941    2 Sheets-Sheet 2

INVENTOR.
William Bradley Lewis
BY
ATTORNEY

Patented Feb. 29, 1944

2,342,676

UNITED STATES PATENT OFFICE 2,342,676

FREQUENCY CONVERTER SYSTEM FOR GEOPHYSICAL PROSPECTING

William Bradley Lewis, Houston, Tex., assignor to Nordel Corporation, Houston, Tex., a corporation of Delaware Application November 26, 1941, Serial No. 420,457

2 Claims. (Cl. 175—182)

This invention relates to systems for making geological explorations of the general type disclosed in the co-pending application of Knute Evjen, 310,109, now Patent 2,294,395, dated Sept. 1, 1942, wherein a current having a controlled low frequency of the order of 20 cycles per second or less is passed through the earth between spaced electrodes and the induced potential is picked up by a pair of potential electrodes located within the field of influence in the earth current, and is balanced against a measuring potential derived from the earth current circuit. In the system disclosed in the Evjen application above mentioned a direct current source is utilized for energizing the earth current circuit, the current being reversed by suitable reversing means, such as commutators operated at controlled frequencies.

It is an object of the present invention to provide an improved system of the type above indicated.

Another object is to make an alternating current source available for energizing the earth current circuit in a system of the above type.

Another object is to provide a novel and improved frequency converter for converting current from an alternating current source to an alternating current of a controlled lower frequency.

Various other objects and advantages will be apparent as the nature of the invention is more fully disclosed.

In accordance with the present invention I utilize a set of electron-discharge tubes, such as thyratrons, for effecting the frequency conversion. In one embodiment four such tubes are used connected in a bridge circuit and so arranged that the anodes of all of said tubes become positive during one-half cycle of the alternating current and become negative during the other half cycle. A control potential is impressed upon the control elements or grids of the various tubes from the same alternating current source through the medium of a reversing commutator so connected that the control potential on the grids of one pair of tubes is in phase with the anode potential while the control potential on the grids of the other pair of tubes is 180° out of phase with the anode potential, the connections to the two pairs of tubes being reversed by the commutator. In this way one pair of tubes is made conductive with the commutator in one position and the other pair of tubes is made conductive with the commutator in the opposite position. By a suitable output connection an output potential is thus obtained which reverses in direction in response to reversals at the commutator. The frequency of the output current is controlled by the speed of the operation of the commutator and is entirely independent of the frequency of the alternating current source.

In the embodiment above referred to, the output current is in the form of a plurality of unidirectional pulses due to the utilization of only one-half cycle of the alternating current. In a further embodiment utilizing another set of tubes connected to be actuated in accordance with the other half cycle of the alternating current, full-wave rectification is obtained in the output circuit. This current may be considered to have a substantially square wave form.

As applied to geological explorations of the type referred to in the above mentioned Evjen application, alternating current from a given source is converted, by means of the system above described to an alternating current having a predetermined lower frequency which is passed through the earth between current electrodes. Currents of the same low frequency are picked up from potential electrodes and are rectified by a commutator actuated in synchronism with the first commutator to provide a unidirectional picked-up potential. A direct measuring potential is obtained from the first alternating current circuit through a transformer and rectifier system which produces, in a potentiometer connected across the rectifier system, a potential drop proportional to the current flowing at any instant in the earth current circuit. This potential drop is balanced against the rectified picked-up potential derived from the potential electrodes, the measurements thus obtained serving as an indication of the earth's characteristics in the location under investigation. As pointed out in the above mentioned Evjen application, a set of such measurements are taken at any given locality, using different low frequencies and the results may be interpreted to indicate the earth's characteristics at the various locations under investigation.

Although the novel features which are believed to be characteristic of this invention are pointed out more particularly in the claims appended hereto, the invention itself may be better understood by referring to the following description, taken in connection with the accompanying drawings, in which a specific embodiment thereof has been set forth for purposes of illustration.

Figure 1:
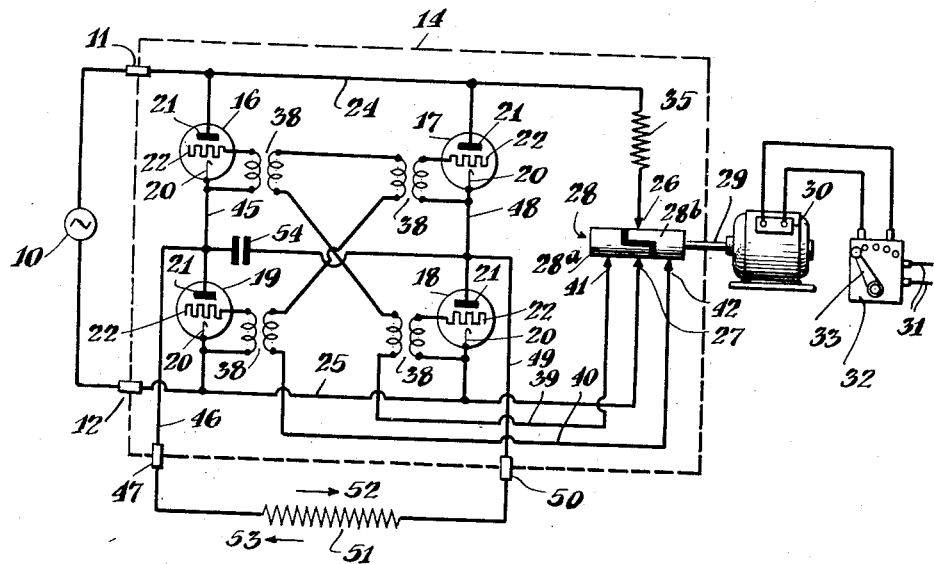
Fig. 1 is a schematic diagram of a frequency conversion system embodying the present invention.

In the following description and in the claims certain specific terms are used for convenience in referring to various details of the invention. These terms, however, are to be given as broad an interpretation as the state of the art will permit.

Referring to the drawings, a suitable source of alternating current, such as a generator 10, is connected to input terminals 11 and 12 of a frequency converter 14 embodying the present invention.

The frequency converter comprises a plurality of electron tubes of the thyratron type which are rendered conductive when a predetermined positive potential is applied to the grid or control element thereof and which, when once rendered conductive, remain conductive until the anode potential falls below a predetermined value. The frequency converter 14 comprises four such tubes 16, 17, 18 and 19, each having a cathode 20, an anode 21 and a control element or grid 22. The anodes 21 of tubes 16 and 17 are shown as connected to the input terminal 11 by a line 24 and the cathodes 20 of tubes 18 and 19 are shown as connected to the input terminal 12 by a line 25. The cathodes 20 of tubes 16 and 17 are connected respectively to the anodes 21 of tubes 19 and 18 by leads 45 and 48. Lines 24 and 25 are further connected by means of brushes 26 and 27 respectively to a reversing commutator 28 having segments 28a and 28b and connected to be driven by the shaft 29 of a motor 30. The motor 30 may be of the variable speed type and may be connected to be driven from line 31 through a speed control device 32 having a suitable control handle 33 for controlling the speed of operation of the motor 30 and indicating by its position the speed of operation of said motor and hence the frequency of reversal effected by the commutator 28. A suitable resistance 35 may be connected in series with the line 24 leading to the commutator 28 to reduce to the desired value the current passing therethrough.

The grids 22 of the tubes 16 to 19 are each connected to the secondary of a transformer 38. The primaries of all of the transformers 38 are connected in series with leads 39 and 40 which are connected by brushes 41 and 42, respectively, to the segments 28a and 28b of the reversing commutator 28. It is to be understood that this series arrangement is shown for convenience only, and that a parallel arrangement, or any combination of series parallel arrangements that would produce the same result, may be used. The secondaries of the transformers 38 associated with the grids of the tubes 16 and 18 are connected in opposite phase with respect to the secondaries of the transformers 38 associated with the tubes 17 and 19, so that at any instant current flowing through the circuit including the lines 39 and 40 and the various primaries, causes the grids of two of said tubes to be positive and the grids of the other two tubes to be negative with respect to their cathodes.

The lead 45 connecting the cathode 20 of the tube 16 with the anode 21 of the tube 19 is connected by a line 46 to an output terminal 47. The lead 48 connecting the cathode 20 of the tube 17 with the anode 21 of the tube 18 is connected by a line 49 to an output terminal 50. The output terminals 47 and 50 are connected to a suitable load indicated at 51.

A condenser 54 is shown as connected between the cathodes 20 of the thyratrons 16 and 17. This tends to smooth out the ripples in output current. Such condenser, however, may be omitted if it is not required in any particular instance.

Operation of Fig. 1

In the operation of the frequency converter shown in Fig. 1 the anodes 21 of the various tubes 16 to 19 are made positive with respect to their cathodes 20 during each positive half cycle of the potential supplied to the input terminals 11 and 12 from the alternating current source 10. During the negative half cycle the anodes of all of the tubes are negative with respect to their cathodes and no action will take place regardless of the grid potential.

With the commutator 28 in any given position a potential is supplied to the grids 22 of the various tubes through the lines 39 and 40 and the transformers 38. The connection of the primaries of the various transformers 38 is such that, during the positive half cycle, the grids of two of the tubes, for example the tubes 16 and 18, are made positive by energy derived from the alternating current source 10, whereas the grids of the other two tubes, for example the tubes 17 and 19, are made negative.

Under the conditions above stated, the tubes 16 and 18 are made conductive and the tubes 17 and 19 are made non-conductive. Current will thus flow from the alternating current source 10, through the input terminal 11, the tube 16, lead 45, line 46, output terminal 47, load 51 in the direction of the arrow 52, output terminal 50, line 49, lead 48, tube 18, line 25 and input terminal 12, back to the alternating current source 10.

If now the commutator 28 is reversed in position so that the direction of flow of current through the primaries of the various transformers 38 is reversed, the grids of the tubes 16 and 18 will be made negative with respect to their cathodes and the grids of the tubes 17 and 19 will be made positive. Tubes 16 and 18 thus become non-conductive as soon as their anodes become negative, which will occur at the next negative half cycle of the source 10. During the positive half cycle the tubes 17 and 19 are now conducting. Current will then flow from the source 10, terminal 11, line 24, tube 17, lead 48, line 49, output terminal 50, load 51 in the direction of the arrow 53, output terminal 47, line 46, lead 45, tube 19, input terminal 12 and back to the other side of the alternator 10.

From the above, it is evident that the direction of the current passing through the load 51 reverses in response to reversals of the commutator 28 and that an alternating current is thus produced which flows through the load 51 at a controlled frequency which is lower than the frequency of the alternating current source 10 and may be controlled as desired by the control device 32.

The current flowing through the load 51 takes the form of a plurality of pulses corresponding to the various positive half cycles of the potential of the alternating current source 10, which are reversed in groups in accordance with the position of the commutator 28. The pulses may be smoothed out if desired by suitable inductances in the output circuit.

It will be noted that in the above construction the various tubes are arranged in the form of a bridge circuit which becomes unbalanced with respect to the load in one direction or the other under the control of the commutator 28.

Fig. 2

Figure 2:
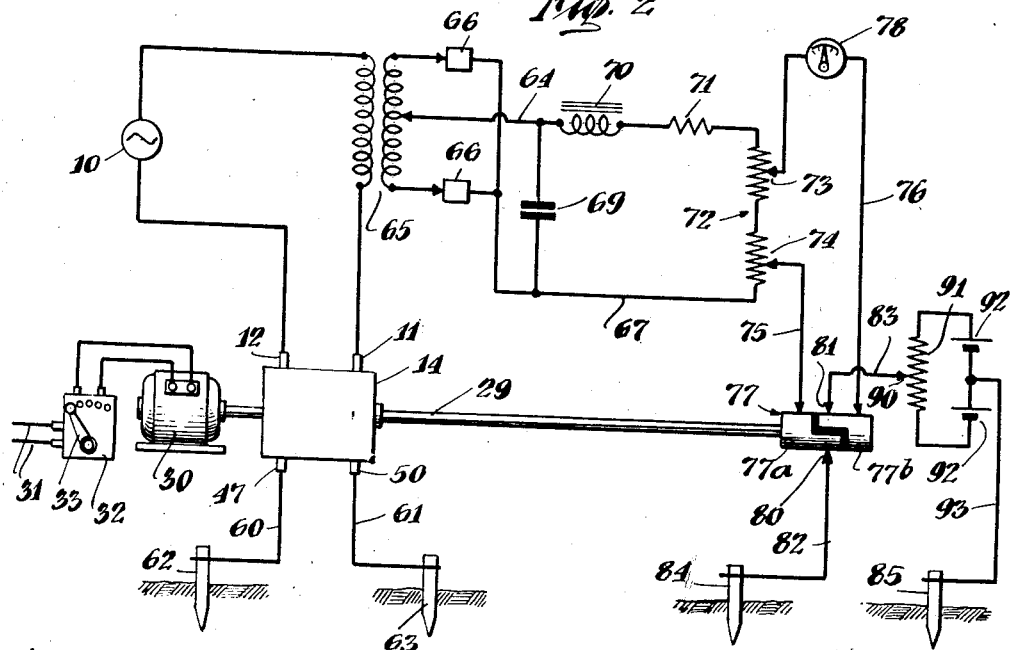
Fig. 2 is a schematic diagram of the frequency conversion system of Fig. 1 embodied in a system for geological exploration.
Figure 2:

In the system illustrated in Fig. 2, the above described frequency converter is applied to electrical prospecting apparatus of the general type disclosed in the Evjen application above referred to. In Fig. 2 parts corresponding to those of Fig. 1 have been given corresponding reference characters and will not be redescribed. The output terminals 47 and 50 of the frequency converter 14 in Fig. 2 are connected by lines 60 and 61 respectively to suitable ground electrodes 62 and 63, herein referred to for convenience as current electrodes. The current electrodes are spaced at convenient distances apart which may be of the order of several thousand feet and, when the commutator 28 is driven at a suitable speed by the motor 30, an alternating current having a frequency corresponding to the speed of rotation of the commutator passes through the earth.

In the embodiment of Fig. 2, a transformer 65 is connected in series with the source of alternating current 10 and between said source and the input terminal 11 of the converter 14 so that the primary of the transformer 65 carries an alternating current proportional to the current flowing in the earth current circuit.

The secondary of the transformer 65 is connected through a full wave rectifier system and a filter network to a potentiometer 72. The rectifier system comprises rectifiers 66 connected between the two ends of the secondary and a line 67 which is connected to one side of the potentiometer 72. The mid-point of the secondary is connected by a line 64, through a series inductance 70 and resistance 71, to the other side of the potentiometer 72. A shunt capacity 69 forms, with the elements 70 and 71, a filter network.

Rectified current thus flows through the potentiometer 72 and produces a voltage drop therein proportional to the current flowing in the secondary of the transformer 65 and hence to the current in the earth current circuit. The potentiometer 72 is provided with adjustable taps 73 and 74 which are connected by lines 75 and 76 respectively to two segments 77a and 77b of a reversing commutator 77. A direct current indicating device, shown as a galvanometer 78, is connected in series in the line 76 between the commutator segment 77b and the adjustable tap 73. The galvanometer 78 is preferably of the highly damped type so that it is influenced only by the direct current component and not by any ripple or other alternating component in the circuit under measurement.

Reversing contacts 80 and 81 of the commutator 77 are connected by lines 82 and 83 respectively to a potential electrode 84 and to the movable contact 90 of a voltage divider resistance 91. A source of potential shown as a battery 92 is connected across the resistance 91. The midpoint of the battery 92 is connected by a line 93 to the other potential electrode 85. The commutator 77 is mounted on the shaft 29 with the commutator 28 above described and is driven in synchronism therewith by the motor 30.

Operation of Fig. 2

In the operation of this system the current electrodes 62 and 63 are located at selected points on the earth's surface and the potential electrodes 84 and 85 are located at points within the field of influence of the earth current. The source 10 is adjusted to pass a predetermined amount of current through the earth circuit. This current is converted by the frequency converter 14 to a current having a frequency which is determined by the setting of the motor speed control device 32. If the measurements are to be taken with direct current the commutator 28 remains stationary. For low frequency alternating current the commutator is slowly rotated at the selected speed as indicated by the control device 32.

The potential induced in the secondary of the transformer 65 is proportional to the current flowing in the earth circuit. Consequently, the rectified current flowing through the potentiometer 72 is proportional to the earth current at any particular instant.

The induced potential is picked up by the potential electrodes 84 and 85 and is rectified by the commutator 77, the rectified potential being impressed across the portion of the potentiometer 72 between the variable taps 73 and 74. Suitable adjustments are made of these taps to produce a zero reading on the galvanometer 78 which thus indicates that the voltage drop across the intermediate portion of the potentiometer exactly balances the potential which is picked up by the potential electrodes after the latter has been rectified by the commutator 77.

The effect of any residual earth currents which would tend to produce a constant direct potential across the electrodes 84 and 85 is eliminated by suitable adjustment of the voltage divider 91. This adjustment may be made, for example, while no current is flowing through the earth circuit so that the only effect on the galvanometer 78 represents the effect of the residual earth current. It may also be made during operation of the system inasmuch as the residual earth current, which is a uni-directional current, is reversed by the commutator 77 to produce an alternating current at the galvanometer 78 which causes fluctuations of the galvanometer. The adjustment of the contact 90 may accordingly be made to eliminate this fluctuation of the galvanometer. Any drift in the natural earth potential will be immediately perceived and can be compensated for by readjustment of the voltage divider.

The potentiometer 72 is not connected directly to the earth current circuit inasmuch as the transformer 65 intervenes. Consequently, there is no direct metallic connection in the coupling between the earth current circuit and the potential circuit. Hence, the effect of any current flow or potential difference between the two circuits is eliminated.

The setting of the potentiometer 72 measures the effective impedance of the earth to an electric current of the frequency at which the measurement is being taken. This measurement is repeated at different low frequencies and at different parts in the area under investigation. The various readings thus obtained may be interpreted to give an indication of the characteristics of the area under investigation.

Fig. 3

Figure 3:
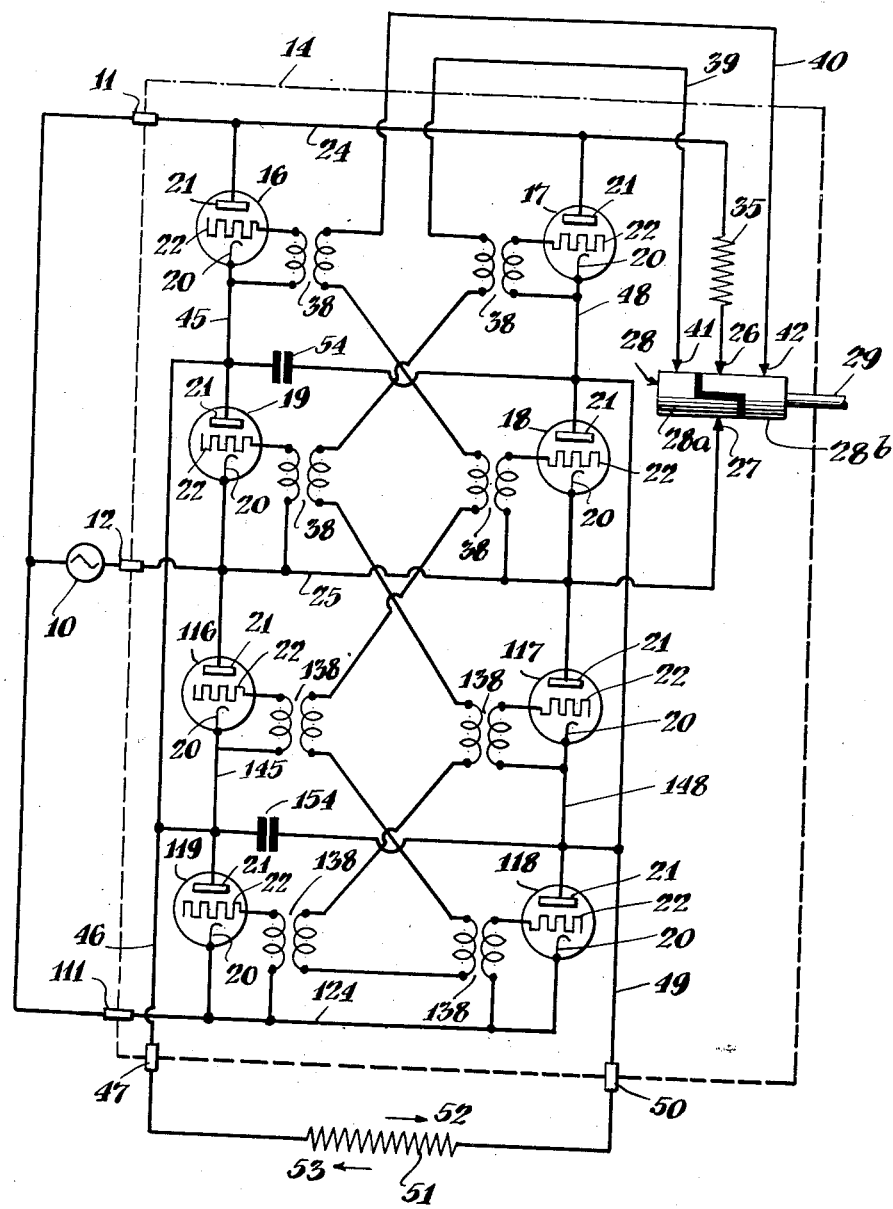
Fig. 3 is a schematic diagram of a full wave frequency converter system embodying the present invention.

In the embodiment shown in Fig. 3 the frequency conversion system of Fig. 1 has been duplicated for both half cycles of the alternating current produced by the generator 10. In this figure the parts identical with those of Fig. 1 which produce half wave conversion are given the same reference characters. The duplicate parts which result in the conversion of the other half wave are given the same reference characters increased by one hundred. In this embodiment the primaries of all of the transformers 38 are connected in series and are so arranged with respect to the anodes of the various tubes that two of the tubes are always conducting.

In the operation of this system consider first the positive half cycle of the alternating voltage supplied from the source 10 when the input terminal 12 is made negative and the input terminal 11 is made positive. Assume also that the current flow through the primaries of the transformers 38 associated with the tubes 16 and 18 is in such a direction that the grids of said tubes are positive while the grids of the tubes 17 and 19 are negative. Current will then flow in a path from the source 10, input terminal 11, tube 16, lead 45, line 46, output terminal 47, load 51 in the direction of the arrow 52, output terminal 50, line 49, lead 48, tube 18, line 25 and input terminal 12 to the source 10. At this instant the tubes 116 to 119 are all non-conductive inasmuch as the input terminal 12 is negative with respect to the input terminal 111 and the anodes of the various tubes 116 to 119 are thus made negative.

In the next half cycle of the current from the generator 10 a positive potential is supplied to the input terminal 12 and negative potentials are supplied to the input terminals 11 and 111. The negative potential of the input terminal 11 makes the anodes of the tubes 16 to 19 negative and renders said tubes non-conductive. The input terminal 111, however, being negative with respect to the input terminal 12 places a positive voltage upon the anodes of the various tubes 116 to 119. Assuming that under the conditions above mentioned the grids of the tubes 116 and 118 are made positive and the grids of tubes 117 and 119 are made negative, current will then flow from the source 10, input terminal 12, the tube 116, lead 145, line 46, output terminal 47, load 51 in the direction of the arrow 52, output terminal 50, line 49, lead 148, tube 118, line 124, input terminal 111 and back to the source 10.

The system thus described operates as a full wave rectifier, unidirectional current flowing through the load 51 in the direction of the arrow 52 as long as the grid potentials remain as above specified. If now the grid potentials are reversed by actuation of the commutator 28, tubes 17, 19, 117 and 119 are made conducting and tubes 16, 18, 116 and 118 are made non-conducting. For the half cycle of the source 10 during which the input terminal 11 is positive, current will then flow from the source 10, input terminal 11, thyratron 17, lead 48, line 49, output terminal 50, load 51 in the direction of the arrow 53, output terminal 47, line 46, lead 45, tube 19, line 25 and input terminal 12 to the source 10. During the other half cycle while the input terminal 111 is negative and the input terminal 12 positive, current will flow from the source 10, input terminal 12, line 25, tube 117, lead 148, line 49, output terminal 50, load 51 in the direction of the arrow 53, output terminal 47, line 46, lead 145, tube 119, line 124, input terminal 111 to the source 10. It is thus seen that a continuous unidirectional current flows through the load 51 in the direction of the arrow 53 as long as the commutator 28 remains in the second position.

The current in the load 51 in the embodiment of Fig. 3 has, substantially, a rectangular wave form with a steep wave front.

Inasmuch as the grids of the thyratrons are potential operated elements, substantially no current flows through the grid circuit. Consequently, substantially currentless commutation is obtained, although currents of substantial values may be handled by the various thyratrons. The converter system of Fig. 3 may be applied to the geological exploration system of Fig. 2 in the manner described above with reference to the converter 14.

The above system is particularly suited to geophysical explorations of the type above indicated inasmuch as comparatively large earth currents may be readily controlled as to frequency and wave form, and measurements of the picked-up potential may be readily and accurately obtained. A specific embodiment of the invention has been shown for purposes of illustration. It is to be understood, however, that various changes and modifications may be made therein as will be readily apparent to a person skilled in the art. The invention is only to be limited in accordance with the scope of the following claims.

What is claimed is:

1. A system for electrical prospecting comprising an earth current circuit including a source of alternating current of a given frequency, a pair of spaced earth electrodes, a frequency converter including a reversing means operating at a controlled lower frequency connected between said source and said electrodes for converting said alternating current to an alternating current of said controlled frequency whereby an earth current of said controlled frequency is passed through the earth between said electrodes, a potential circuit including potential pick-up electrodes located at spaced points lying within the field of influence of said earth current, a direct current indicating device connected to indicate the potential of said potential circuit, reversing means synchronized with said first reversing means and connected between said potential pick-up electrodes and said indicating device to convert the picked-up potential different into a unidirectional potential suited to actuate said indicating device, and coupling circuits interconnecting said earth current circuit and said potential circuit to impress on said potential circuit a unidirectional balancing potential which is directly proportional to the current flowing in said earth current circuit at the instant of measurement, said coupling circuit comprising a transformer having a primary connected in the earth current circuit on the higher frequency side of said converter to receive alternating current from said source, a rectifier connected to the secondary of said transformer to rectify the induced potential, a resistor connected to receive rectified current from the rectifier and to thereby develop a potential drop proportional to the instantaneous current flowing in said earth circuit, and connections for balancing the potential drop in said resistor against the rectified picked-up potential.

2. The system set forth in claim 1 in which the frequency converter comprises a set of electron discharge tubes connected in a bridge circuit with respect to the alternating current source and the earth electrodes, and the reversing means is connected to control the grid potentials of said tubes in a manner to reverse the current in the earth electrode circuit.

WILLIAM BRADLEY LEWIS.